United States Patent
Cromwell et al.

(10) Patent No.: US 10,085,424 B2
(45) Date of Patent: Oct. 2, 2018

(54) SELF-CONTAINING, RETRACTABLE LEASH AND COLLAR/HARNESS ASSEMBLY

(71) Applicants: Michael Kenneth Cromwell, Gulfport, FL (US); Derek Schall, St. Petersburg, FL (US)

(72) Inventors: Michael Kenneth Cromwell, Gulfport, FL (US); Derek Schall, St. Petersburg, FL (US)

(73) Assignee: In the Lead, LLC, Gulfport, FL (US)

( * ) Notice: Subject to any disclaimer, the term of this patent is extended or adjusted under 35 U.S.C. 154(b) by 401 days.

(21) Appl. No.: 14/584,498

(22) Filed: Dec. 29, 2014

(65) Prior Publication Data

US 2015/0107533 A1    Apr. 23, 2015

Related U.S. Application Data

(63) Continuation of application No. 13/847,689, filed on Mar. 20, 2013, now Pat. No. 8,919,293.

(60) Provisional application No. 61/638,736, filed on Apr. 26, 2012, provisional application No. 61/613,104, filed on Mar. 20, 2012.

(51) Int. Cl.
  *A01K 27/00* (2006.01)

(52) U.S. Cl.
  CPC .......... *A01K 27/004* (2013.01); *A01K 27/001* (2013.01)

(58) Field of Classification Search
  CPC .. A01K 27/001; A01K 27/004; A01K 27/003; A01K 27/008; Y10T 24/45529; Y10T 24/45534; A44B 11/266
  USPC ....... 119/795, 796, 794; 24/614, 615, 163 R, 24/200, 165, 182
  See application file for complete search history.

(56) References Cited

U.S. PATENT DOCUMENTS

| | | | |
|---|---|---|---|
| RE34,351 E | 8/1993 | Lacey | |
| 5,279,335 A * | 1/1994 | Bassi | D03C 3/40 139/59 |
| 6,205,956 B1 * | 3/2001 | Dickie | A01K 27/005 119/776 |
| 6,378,466 B1 * | 4/2002 | Oyster | A01K 27/00 119/863 |

(Continued)

OTHER PUBLICATIONS

US 7,819,089, 10/2010, Bennett et al. (withdrawn)

*Primary Examiner* — Tien Quang Dinh
*Assistant Examiner* — George A Andonyan
(74) *Attorney, Agent, or Firm* — Nilay J. Choksi; Smith & Hopen, P.A.

(57) ABSTRACT

A retractable leash and collar/harness assembly. The assembly includes a hub that contains a spring member and leash line coiled and enclosed within the hub. The spring member and leash line remain in constant communication with each other. The hub contains an aperture through which the leash line can flow. Extending outwardly from the hub are snap buckles, one of which is structured to have a channel formed therein. The leash line can flow through the channel to a handle, which is contained within a pouch formed on the attached collar. When the leash is pulled, the handle separates from the pouch, followed by the leash line. Thus, when in use, the leash line follows a path of travel from the hub, through the snap buckle, through the pouch and into the external environment. In an alternative embodiment, the current invention may be a leash and harness assembly.

8 Claims, 15 Drawing Sheets

(56) References Cited

U.S. PATENT DOCUMENTS

| | | | |
|---|---|---|---|
| 6,481,382 B2 | 11/2002 | Cohn | |
| 6,581,547 B1 | 6/2003 | Austin | |
| 7,461,615 B2 | 12/2008 | Albright | |
| 7,610,880 B2 | 11/2009 | Lord | |
| 8,156,901 B2 * | 4/2012 | Muelken | A01K 15/021 |
| | | | 119/720 |
| 8,196,273 B2 * | 6/2012 | Anscher | A44B 11/266 |
| | | | 24/265 BC |
| 8,209,825 B2 * | 7/2012 | Carter | C07H 1/06 |
| | | | 24/606 |
| 8,220,517 B2 | 7/2012 | Kollman et al. | |
| 8,522,410 B2 * | 9/2013 | Parisi | A44B 11/2546 |
| | | | 24/606 |
| 8,683,959 B2 * | 4/2014 | Friedland | A01K 1/04 |
| | | | 119/792 |
| 2006/0144343 A1 | 7/2006 | Price | |
| 2006/0288960 A1 | 12/2006 | Harrison | |
| 2008/0163830 A1 | 7/2008 | Dagnon | |
| 2008/0263836 A1 * | 10/2008 | Howell | A44B 11/2592 |
| | | | 24/614 |
| 2009/0255485 A1 | 10/2009 | Dickie et al. | |
| 2009/0255486 A1 | 10/2009 | Thompson et al. | |
| 2010/0162966 A1 * | 7/2010 | McFarland | A01K 27/004 |
| | | | 119/794 |
| 2010/0251970 A1 | 10/2010 | Dagnon | |
| 2011/0023794 A1 | 2/2011 | Smith | |
| 2011/0174238 A1 | 7/2011 | Dagnon | |
| 2013/0276718 A1 * | 10/2013 | Valadez | A01K 27/004 |
| | | | 119/796 |
| 2015/0020751 A1 * | 1/2015 | Pattie | A47D 13/086 |
| | | | 119/770 |

\* cited by examiner

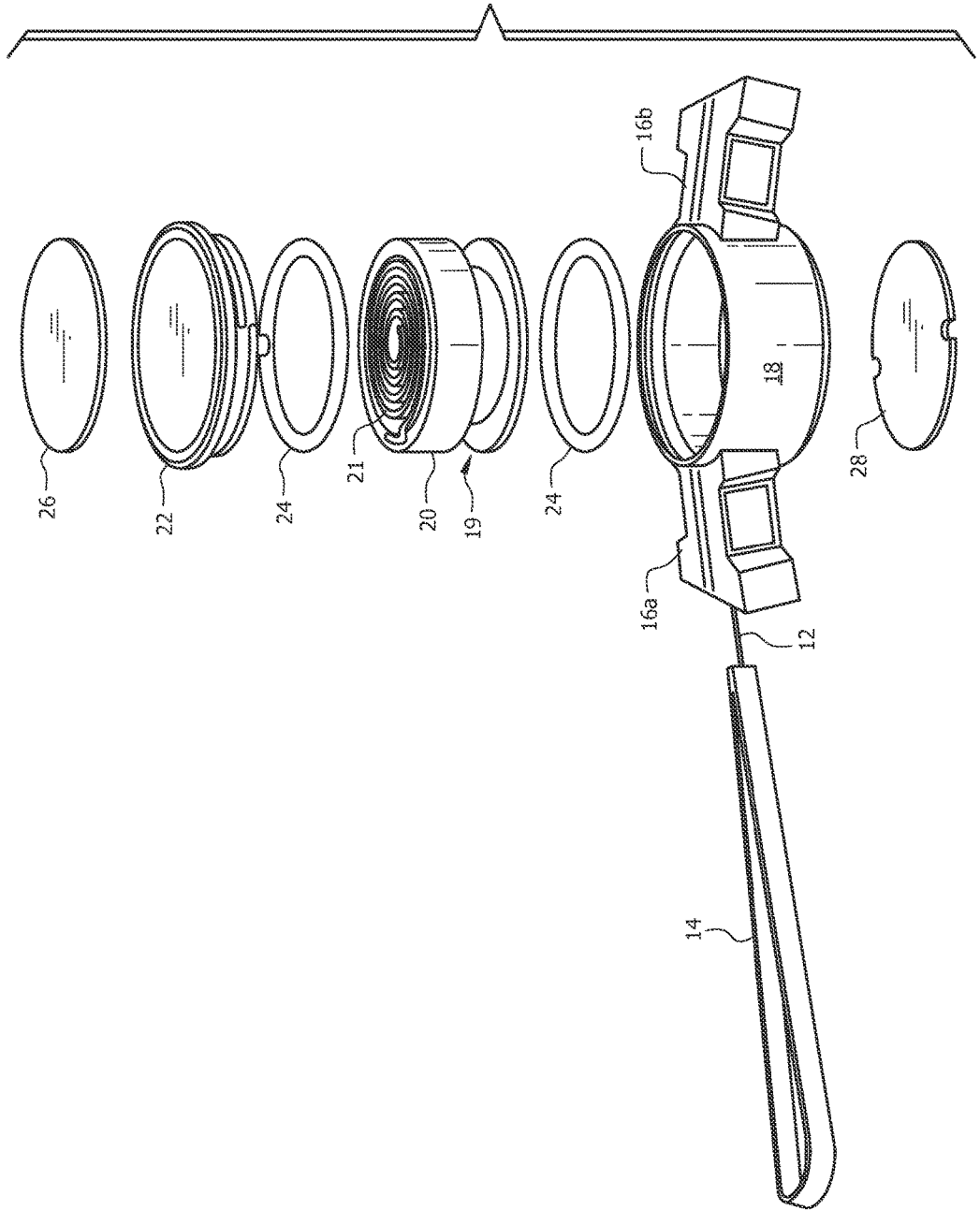

SELF-CONTAINING, RETRACTABLE LEASH AND COLLAR/HARNESS ASSEMBLY

CROSS-REFERENCE TO RELATED APPLICATIONS

This nonprovisional application is a continuation of and claims priority to currently pending U.S. Nonprovisional application Ser. No. 13/847,689, entitled "Self-Containing, Retractable Leash and Collar Harness/Assembly", filed Mar. 20, 2013, which is a continuation of and claims priority to U.S. Provisional Application No. 61/638,736, entitled "Dog Collar", filed Apr. 26, 2012 and to U.S. Provisional Application No. 61/613,104, filed Mar. 20, 2012, all of which are incorporated herein by reference in their entireties.

BACKGROUND OF THE INVENTION

1. Field of the Invention

This invention relates, generally, to dog leashes. More particularly, it relates to a self-contained assembly containing a dog collar/harness with built-in retractable dog leash.

2. Description of the Prior Art

Pet collars and harnesses with built-in leashes are well-known in the art. For example, U.S. Patent App. Pub. No. 2008/0163830 describes a retractable leash and collar assembly, wherein the leash is contained within a housing integrated into the surface of the collar. The housing feeds into the aperture that allows the leash to enter and exit the collar.

U.S. Patent App. Pub. No. 2009/0255486 describes a combination pet collar and leash. The collar assembly communicates with a leash assembly, which is associated with a handle. The collar assembly has attached thereto a circular housing that contains a retraction mechanism that biases a spool to rotatably receive the leash. The handle can be fastened to the collar and lies in overlying relation to the collar when in a retracted position.

U.S. Patent App. Pub. No. 2010/0251970 describes a retractable leash and collar assembly, wherein the leash is contained within a housing integrated into the surface of the collar. The housing feeds into the aperture that allows the leash to enter and exit the collar.

U.S. Patent App. Pub. No. 2011/0023794 describes an assembly comprising an adjustable collar and retractable leash. The leash is located within a housing and is wound about a spring-actuated spool. At the other end, the leash is attached to a handle that aesthetically forms a side of the housing when in a retracted position.

U.S. Patent App. Pub. No. 2011/0174238 describes a collar and retractable leash assembly. The collar has a pouch coupled thereto with a retraction assembly contained therein. A cord is connected to the retraction assembly and is wound up within the pouch when the apparatus is in a retracted position. A handle is coupled to the end of the cord opposite from the retraction assembly. In a retracted position, the handle is substantially contained within the pouch as well.

U.S. Pat. No. 6,481,382 describes a collar and self-retracting leash assembly. In a retracted position, the leash is disposed within the collar along the collar's longitudinal axis. A pulley is also disposed within the collar to facilitate expansion of the leash.

U.S. Pat. No. 6,581,547 describes a pet collar with integrated retractable leash. One end of the leash is attached to a coiled spring, and the other end is attached to the handle. In a retracted position, the leash has a portion fastened to the surface of the collar, and the handle is coupled to the collar as well.

U.S. Pat. No. 7,461,615 describes a pet harness with retractable leash secured to the harness, so that the retractable leash is readily accessible on the pet's back. The leash is disposed within a housing, within which the leash is wound around a spool. The handle of the leash is disposed outside of the housing in the retracted position.

U.S. Pat. No. 7,610,880 describes a retractable leash assembly mounted to a collar or harness, wherein the leash is wound about a spool in a housing in a retracted position and is extendable from the spool in an extended position. The leash then extends through an aperture on the side of the housing. The handle remains exterior to the housing when retracted. This and all other referenced patents and applications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

However, the conventional art presents a variety of problems, in particular the conventional art being cumbersome and inconvenient. Accordingly, what is needed is a user-friendly and efficient dog leash and collar/harness assembly. However, in view of the art considered as a whole at the time the present invention was made, it was not obvious to those of ordinary skill how the art could be advanced.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

SUMMARY OF THE INVENTION

The long-standing but heretofore unfulfilled need for an inclusive, accessible dog leash and collar/harness assembly is now met by a new, useful and nonobvious invention.

The novel structure includes a retractable leash and collar assembly. The leash and collar assembly includes a hub having a hollow interior, and a spring (e.g., power spring) and leash line coiled and enclosed within the hub. The spring and leash line remain in communication with each other. A conventional handle is coupled to an outer end of the leash line. The assembly further includes at least one snap buckle that extends outwardly from the surface of the hub. The snap buckle can be a leash-receiving snap buckle that includes a latch, sometimes referred to herein as a snap buckle connector, and corresponding socket, sometimes referred to herein as a snap buckle base. When the latch and socket are engaged to one another, a leash-accommodating channel is formed within the spatial confines of the latch and socket. The purpose of the channel is to allow travel or displacement of the leash line therethrough (the leash line exits the hub via an aperture in the side of the hub). The assembly further includes a collar with one end of the collar coupled to the leash-receiving snap buckle. Additionally, a hollow pouch is formed in that end of the collar. The purpose of the pouch is to enclose the handle, and when the handle is pulled, the pouch allows the leash line to flow therethrough to the handle. More particularly, the novel retractable leash and collar assembly includes a hub having a substantially hollow interior. An aperture is formed in the hub. A coiled spring is enclosed within the hollow interior of the hub and the coiled spring has a first end secured to the hub. A coiled leash line is enclosed within the hollow interior of the hub. The coiled spring has a second end secured to a first, inner end of the coiled leash line. A second, outer end of the coiled leash line extends through the aperture formed in the hub and is disposed externally of the hollow interior of the hub. A handle is coupled to the second, outer end of the leash line. A snap buckle base is formed integrally with and extends radially outwardly from the hub. A channel is formed in the snap buckle base in open, aligned communication with the aperture formed in the hub. A snap buckle connector has a leading end that releasably engages the snap buckle base and a channel is formed in the snap buckle connector in open, aligned communication with the channel formed in the snap buckle base. The snap buckle connector leading end has a position of repose that prevents separation of the snap buckle connecter and the snap buckle base so that the snap buckle connector and snap buckle base remain connected to one another when the leash and collar assembly is in use. The snap buckle connector leading end has a position of non-repose that enables separation of the snap buckle connector from the snap buckle base when the leash and collar assembly is not in use. A collar is secured to a trailing end of the snap buckle connector. The channel formed in the snap buckle base and the snap buckle connector slidingly receives the leash line and constrains the leash line to remain within the channel as the leash line is displaced in a first direction through the channel when the leash line is withdrawn from the hollow interior of the hub through the aperture against an inherent bias of the coiled spring and when the leash line is displaced in a second direction opposite to the first direction when the leash line is drawn into the hollow interior of the hub through the aperture formed in the hub by the inherent bias of the coiled spring.

The opposite end of the collar may be coupled to the hub via a second snap buckle positioned in diametric opposition to the leash-receiving snap buckle on the hub.

A hollow tubing may be disposed within and along the longitudinal extent of the pouch. This allows the handle to be contained within the hollow tubing and allows the leash line to flow through the pouch when in use.

A spring and line housing assembly may be positioned within the hub, such that the spring and leash line are coiled around the housing assembly, and the spring is in communication with the housing assembly. In a further embodiment, the housing assembly may have a notched channel along its circumference, and the leash line would be coiled around the housing assembly within the notched channel.

The leash-receiving snap buckle may be structured as follows. The socket may be attached to the hub and extend outwardly from the hub. The end of the collar having the pouch would then be coupled to a latch that would engage the socket.

Alternatively, the huh may be formed of a capsule and a hub cover disposed in overlying relation to the capsule. The latch of the leash-receiving snap buckle would be attached to the capsule and extend outwardly from the capsule. The hub cover would include a flange that protrudes outwardly from the hub cover and positioned in overlying relation to the latch to form the channel therein through which the leash line can flow.

In a separate embodiment, the current invention comprises a retractable leash and harness assembly for a pet. The leash and harness assembly includes a hub with hollow interior, and a spring (e.g., power spring) and leash line coiled and enclosed within the hub. The spring and leash line remain in communication with each other. An anterior collar portion extends from the hub along the lateral extent of the anterior portion of the pet. A general handle is coupled to the outer end of the leash line and extends along the longitudinal extent of the pet's body. A leash-receiving snap buckle, which includes a latch and corresponding socket, extends outwardly from a surface of the huh. When the latch and socket are engaged, a channel is formed within the spatial confines of the latch and socket combination. The channel allows for the linear movement of the leash line into and out of the hub. A connecting collar is coupled to the leash-receiving snap buckle and extends along the longitudinal extent of the pet in substantially perpendicular relation to the anterior collar portion. A hollow pouch is formed within the connecting collar. The purpose of the pouch is to enclose the handle, and when the handle is pulled, the pouch allows the leash line to flow therethrough to the handle. A posterior collar portion is coupled to the distal end of the connecting collar in substantially perpendicular relation to the connecting collar. There are corresponding connector members on each end of the posterior collar portion to secure the pet within the harness.

A hollow tubing may be disposed within and along the longitudinal extent of the pouch. This allows the handle to be contained within the hollow tubing and allows the leash line to flow through the pouch when in use.

A spring and line housing assembly may be positioned within the hub, such that the spring and leash line are coiled around the housing assembly, and the spring is in communication with the housing assembly. In a further embodiment, the housing assembly may have a notched channel along its circumference, and the leash line would be coiled around the housing assembly within the notched channel.

The leash-receiving snap buckle may be structured as follows. The socket may be attached to the hub and extend outwardly from the hub. The end of the connecting collar having the pouch would then be coupled to a latch that would engage the socket.

Alternatively, the hub may be formed of a capsule and a hub cover disposed in overlying relation to the capsule. The latch of the leash-receiving snap buckle would be attached to the capsule and extend outwardly from the capsule. The hub cover would include a flange that protrudes outwardly from the hub cover and positioned in overlying relation to the latch to form the channel therein through which the leash line can flow.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the nature and objects of the invention, reference should be made to the following detailed disclosure, taken in connection with the accompanying drawings, in which:

FIG. 1C is an exploded view of the capsule and leash of FIG. 1A.

DETAILED DESCRIPTION OF THE PREFERRED EMBODIMENT

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

In an embodiment, the current invention includes a hub or leash housing in line with a pet collar/harness and further includes a leash integrated into the collar/harness.

Figure 1A:
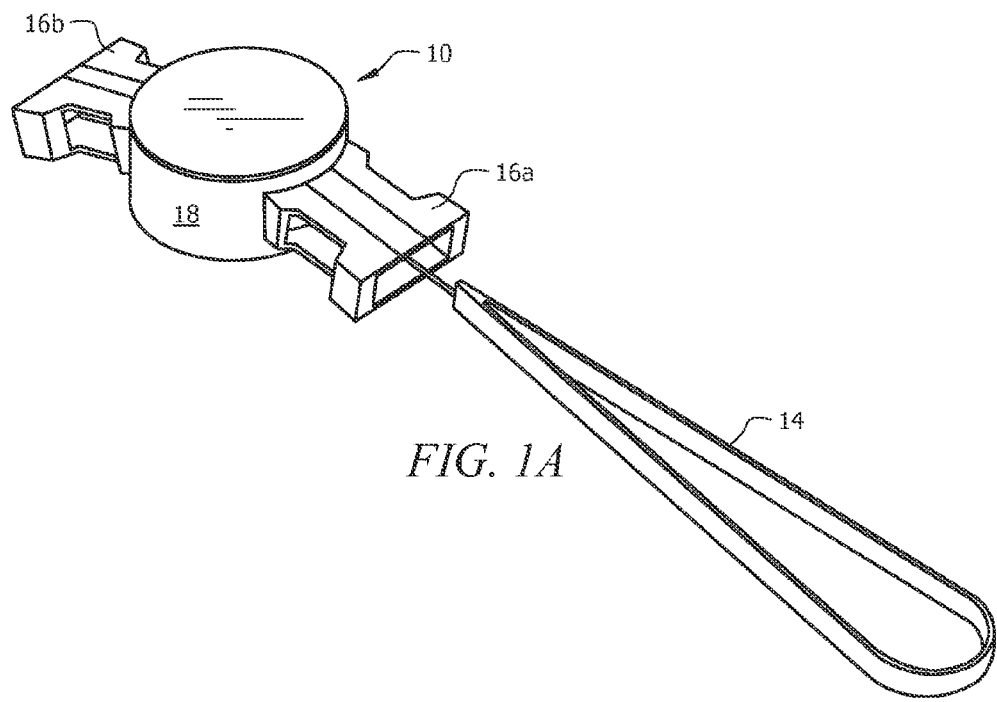
FIG. 1A depicts a capsule and leash extending therefrom according to an embodiment of the current invention.
Figure 1B:
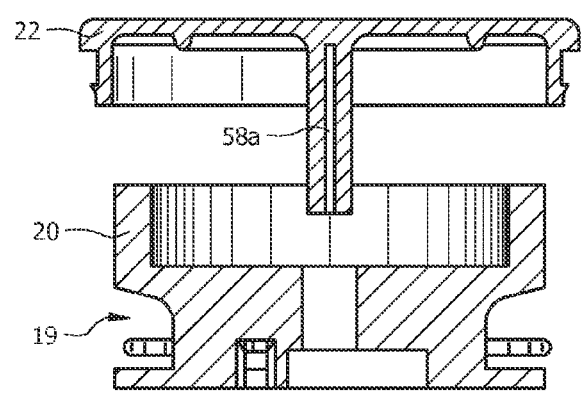
FIG. 1B is a cross-sectional view of the capsule of FIG. 1A.

The hub is generally denoted as a whole in FIGS. 1A-1C by the reference numeral 10. Hub 10 can be formed of any suitable material, for example metal, plastic, carbon fiber, etc. Hub 10 includes capsule 18, which encloses line reel/spring housing assembly 20 and lubrication 24 disposed therearound. Hub 10 not only houses housing assembly 20 but also may act as the female dipping portion of the webbing collar. The center cylindrical area in hub 10 acts as a stabilizer for arbor 58a that is located on hub cover 22.

Power spring 21 is wound or coiled around a forming arbor 58a within spring housing assembly 20. Tension/Power spring 21 may have an inner end connection (not shown) attached to the arbor 58a. The opposite end of power spring 21 terminates in leash line 12, which in turn leads to and is contiguous with handle 14. Any conventional handle type is contemplated by the current invention, though a simple loop strap is depicted in the figures. Leash line 12 may also be wound around arbor 58a in outer relation to power spring 21. Alternatively, leash line 12 may be coiled around channel 19 firmed within housing assembly 20.

Power spring 21 may be any conventional spring, for example a VULCAN CONPOWER® spring, that would be suitable for the purposes of this invention. The function of power spring 21 within spring housing assembly 20 is to create rotational torque from the arbor and/or housing assembly 20. The rotational torque or energy can lead to linear motion of leash line 12 and handle 14. One of ordinary skill in the art would be capable of optimizing size/diameter of the arbor, size/diameter of housing assembly 20, width of housing assembly 20, turns of power spring 21 required, torque required within housing assembly 20, among other optimizing factors when considering the life cycle required of the apparatus, environment in which power spring 21 is used (e.g., frequent winding and unwinding due to leash 12, 14 retracting in and out of capsule 18), etc. Housing assembly 20 may have a sloped plane to facilitate the spooling of leash line 12.

Once power spring 21 is appropriately disposed within spring housing assembly 20, housing assembly 20 is positioned within capsule 18 with the arbor extending therethrough. Lubrication 24 is disposed underneath, over, and/or around housing assembly 20 to facilitate rotation of housing assembly 20, thereby winding and unwinding power spring 21 and leash line 12.

Hub 10 further includes hub cover 22, which is disposed in overlying relation to housing assembly 20, whereby the outer edges of hub cover 22 engage the outer edges of capsule 18 to completely encapsulate housing assembly 20, power spring 21, and leash line 12 contained therein. Hub cover 22 may engage capsule 18 in any manner (e.g., snap, welding, screw down, via the arbor inserted into a corresponding receptor, etc.). In attaching to capsule 18, hub 22 can aid in pre-torquing spring 21, which action is potentially needed to achieve full retraction of spring 21. Hub cover 22 may also hold the arbor in position, as the arbor engages spring 21 to allow torquing.

Polyurethane (or other suitable material) dome 26 and sticker 28 may be disposed in overlying and underlying relation, respectively, to hub 10 to display any logo and provide any added protection (particularly with polyurethane dome 26).

As further seen in FIGS. 1A and 1C, attached to hub 10 are leash-receiving ("LR") socket 16a and collar-receiving ("CR") socket 16b, described more fully infra. Sockets 16a, 16b are attached to hub 10 and directly oppose each other. Sockets 16a, 16b extend in a general perpendicular from the circular outer wall of hub 10 but may be angled to conform to the body (e.g., neck area) of an animal or pet.

In a coiled position, depicted in FIG. 1A, leash line 12 extends out of hub 10 and through LR socket 16a until leash line 12 terminates in its attachment to handle 14. As leash line 12 is unwinding, partially depicted in FIG. 1C, leash line 12 unwinds from within hub 10 and extends through LR socket 16a to allow the pet to move about more freely. In this case, handle 14, becomes further removed from hub 10 as leash line 12 continues to unwind from within hub 10. Because of the structure of the current invention, the leash generally experiences a constant torque, enhancing safety of the apparatus.

CR socket 16b receives the opposite end of collar 30 to secure the apparatus around the pet.

Figure 2:
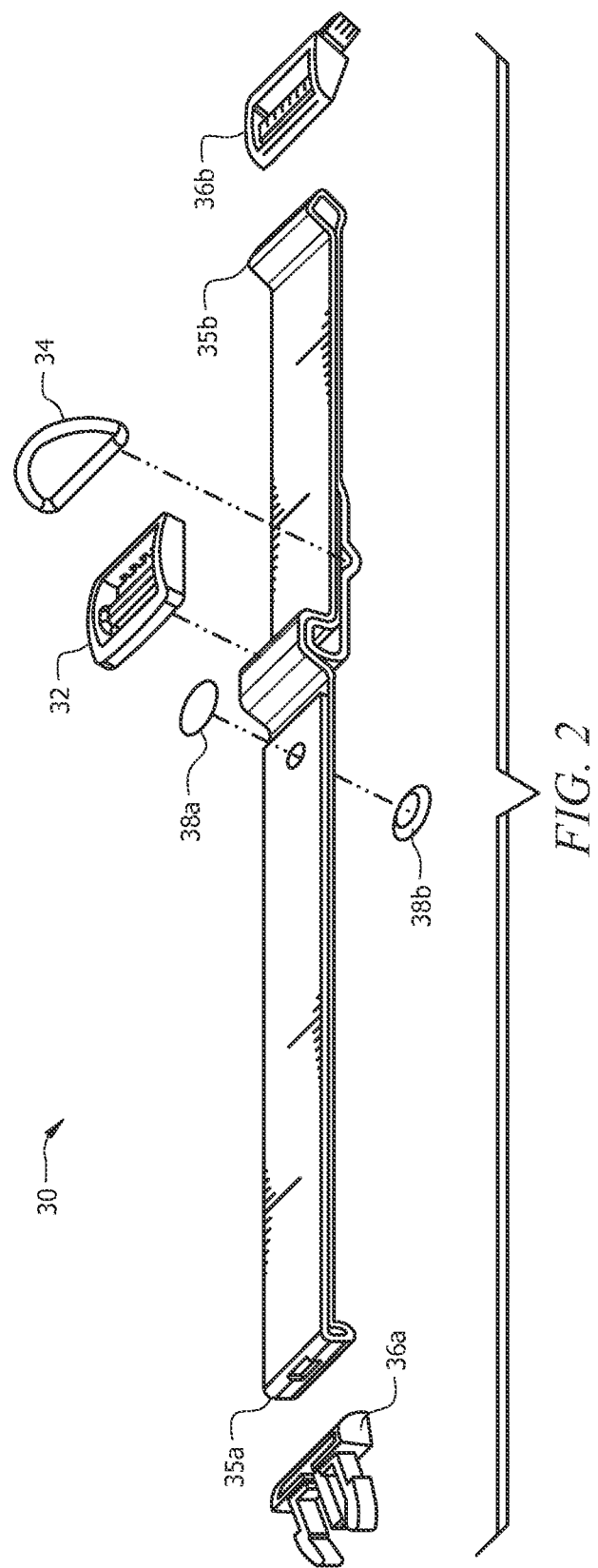
FIG. 2 is an exploded view of the collar aspect of an embodiment of the current invention.

The collar is generally denoted as a whole in FIG. 2 by the reference numeral 30. Collar 30 includes adjustable slide 32, D-ring 34, flap-side connector 38a, collar-side connector 38b. Hub 10 remains in line with collar 30. Collar 30 is adjustable to a pet's size via adjustable slide 32. The function and purpose of flap- and collar-side connectors 38a, 38b will become apparent as the invention is described. In general function (e.g., installation onto the pet, adjustability), collar 30 can be utilized similar to conventional pet collars, and as such includes the appropriate straps and configuration for adjustability. Collar 30 may be interchangeable for customization and/or personalization. Additionally, D-ring 34 permits alternate leashes to be used with collar 30.

As can be seen in FIG. 2, collar 30 has two (2) ends 35A, 35B. End 35A, in particular, lies proximate to connectors 38a, 38b, while end 35B lies on the opposite side of adjustable slide 32 and D-ring 34. In this embodiment, LR latch 36a is secured to end 35A, and CR latch 36b is secured to end 35b. LR latch 36a is structured to correspond to LR socket 16a, and CR latch 36b is structured to correspond to LR socket 16b. Thus, LR latch 36a can be secured to LR socket 16a via snap buckle, and CR latch can 36b be secured to CR socket 16b via snap buckle. Other types of fasteners are contemplated by the current invention as well, for example snap type, hook and loops, snap, button, tie-type, among other conventional fasteners. Thus, when LR latch 36a is secured to LR socket 16a, leash line 12 and handle 14 extend through LR socket 16a, as previously described, and also through LR latch 36a to allow the user to grasp handle 14.

Figure 3A:
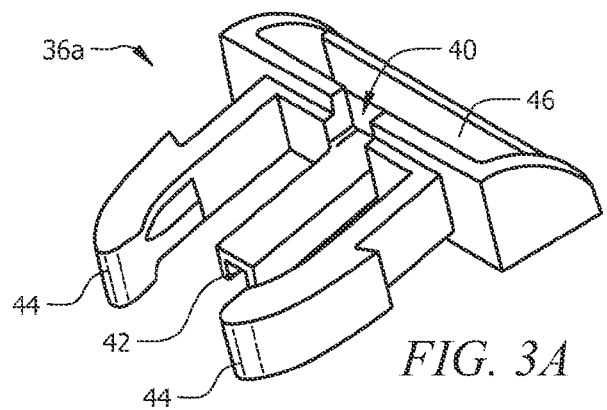
FIG. 3A is a perspective view of a leash-receiving latch according to an embodiment of the current invention.
Figure 3B:
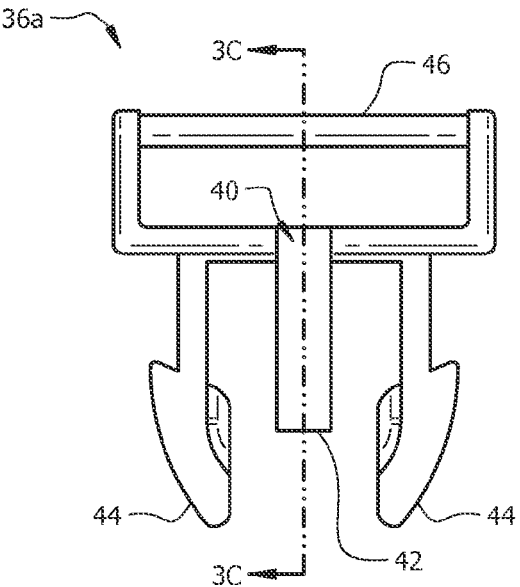
FIG. 3B is a front view of the leash-receiving latch of FIG. 3A.
Figure 3C:
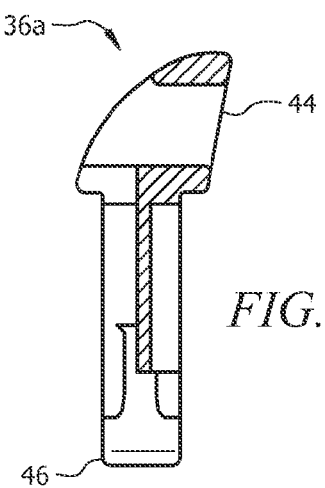
FIG. 3C is a side view of the leash-receiving latch of FIG. 3A.

The LR latch is generally denoted as a whole in FIGS. 3A-3C by the reference numeral 36a. LR latch 36a includes two latch arms 44 symmetrically disposed on either side of n-shaped insert 42. The longitudinal axis of the planar top portion of n-shaped insert 42 follows a path leading to latch channel 40 notched within collar restraint 46. Collar restraint 46 is utilized to secure collar 30 to LR latch 36a.

Figure 4A:
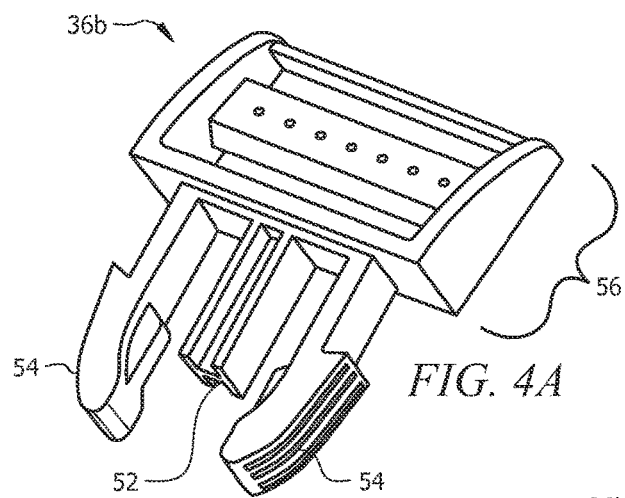
FIG. 4A is a perspective view of a collar-receiving latch according to an embodiment of the current invention.
Figure 4B:
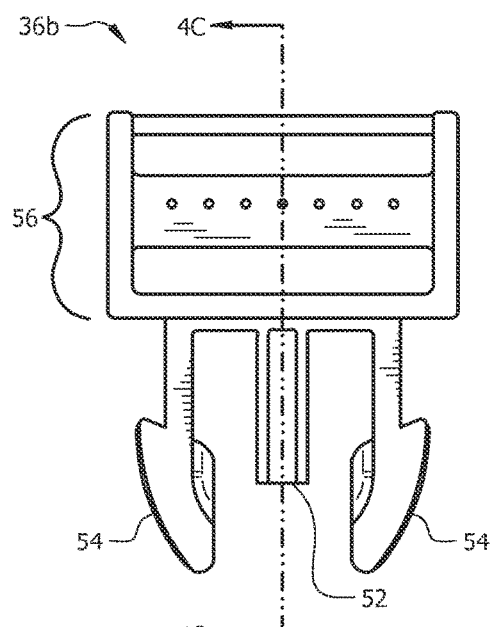
FIG. 4B is a front view of the collar-receiving latch of FIG. 4A.
Figure 4C:
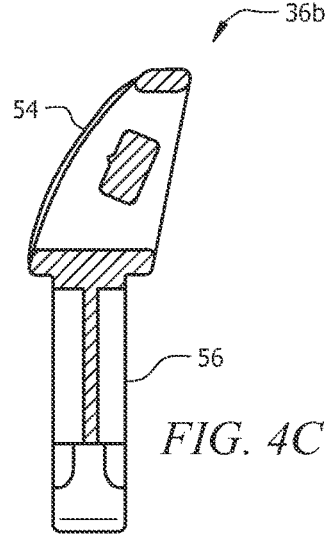
FIG. 4C is a side view of the collar-receiving latch of FIG. 4A.

The CR latch is generally denoted as a whole in FIGS. 4A-4C by the reference numeral 36b. CR latch 36b includes two latch arms 54 symmetrically disposed on either side of H-shaped insert 52. In contrast to LR latch 36a, H-shaped insert 52 does not have a planar top portion leading to a channel. Rather, H-shaped insert 52 is structured to remove any openings. Generally, CR latch 36b and CR socket 16b are similar to conventional snap buckles. CR latch 36b further includes adjustable collar restraint 56, which is utilized to secure collar 30 to CR latch 36b and allow adjustment of leash size.

FIGS. 5A-5D are various views of capsule 18 without housing assembly 20 disposed therewithin. Capsule 18 may include optional spring arbor receptor 58b for receiving spring arbor 58a on hub cover 22. Spring arbor 58a and spring arbor receptor 58b are interchangeable, as functionality tends to be similar whether they are located within capsule 18 or on hub cover 22, or whether both are present in combination or individually.

Figure 5A:
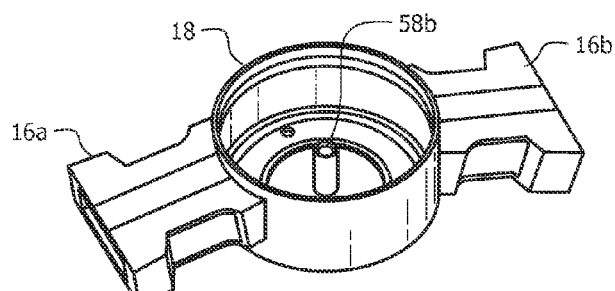
FIG. 5A is a perspective view of a capsule according to an embodiment of the current invention.
Figure 5B:
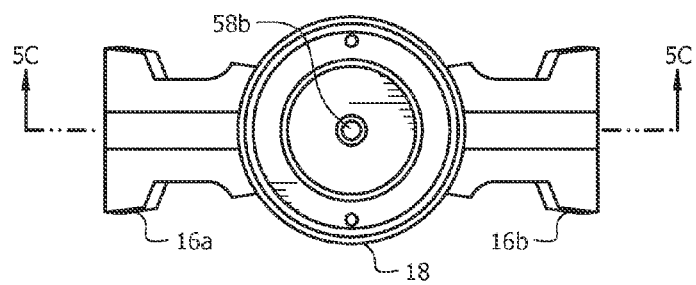
FIG. 5B is a top view of the capsule of FIG. 5A.
Figure 5C:
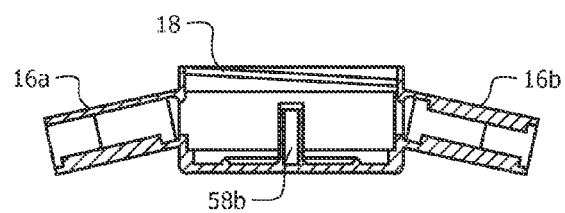
FIG. 5C is a cross-sectional side view along the horizontal extent of the capsule of FIG. 5A.

In this embodiment, LR socket 16a and CR socket 16b are affixed to capsule 18 and are generally symmetrical as they protrude from opposite sides of capsule 18, as seen in FIGS. 5B and 5C.

As a functioning whole, an embodiment of the current invention generally operates as follows. Hub 10 comprises capsule 18 and hub cover 22. Disposed within hub 10 are housing assembly 20, which includes power spring 21 and leash line 12 wound therein (e.g., around spring arbor 58a) or therearound (e.g., if leash line 12 is wound around housing assembly 22 within channel 19), and adequate lubrication 24 to allow housing assembly 20 to rotate smoothly and efficiently. Dome 26 and sticker 28 may be attached in overlying and/or underlying relation to hub 10 to display a logo or other information.

LR socket 16a and CR socket 16b extend symmetrically on opposite sides of hub 10. An aperture (not shown) is disposed on a vertical wall of hub 10 and within the confines of LR socket 16a. Leash line 12 may flow through that aperture. Leash line 12 terminates in its attachment to handle 14. Handle 14 is disposed within a pouch, which can be seen clearly as reference numeral 118 in FIG. 7B, and the pouch can be securely closed so that handle 14 is contained within collar 30. Thus, handle 14 becomes fully integrated into collar 30. Leash line 12 and handle 14 are fully conceals for safety, aesthetics, and usability.

When the pouch is opened, for example by detaching flap-side button 38a and collar-side button 38b, a force can be placed upon handle 14 to retract handle 14 from collar 30. In turn, leash line 12 would unwind from within hub 10 as handle 14 is retracted further from collar 30. At the point of exit of handle 14 and leash line 12 from the pouch, a slip ring (not shown) may be installed to reduce fraying or wear-and-tear on leash line 12.

Collar 30 can be adjustable about the pet's body in a conventional manner via adjustable slide 42, D-ring 34, and collar restraints 46, 56.

Structurally, LR latch 36a has n-shaped insert 42 and latch channel 40 upon and through which leash line 12 can flow smoothly from within hub 10. Thus, the path of travel of leash line 12 is from hub 10, through LR socket 16a, through LR latch 36a (within channel 40 and on top of n-shaped insert 42), and through the pouch to handle 14. This allows leash line 12 and handle 14 to be securely and fully contained within the leash and collar assembly in this manner to provide easy access to the user and to facilitate use of the leash without separate, complex moving parts.

Example 1

Figure 6A:
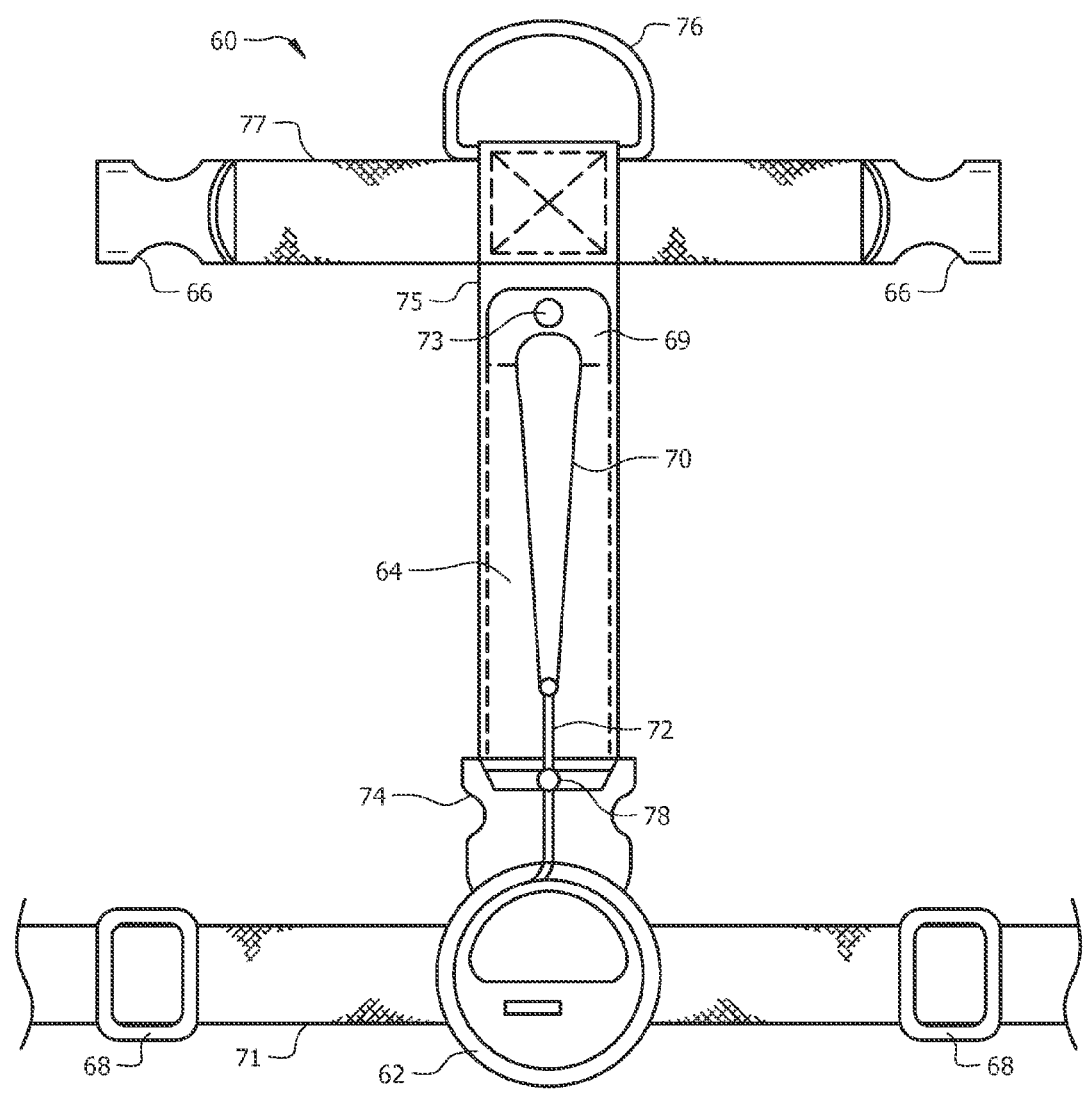
FIG. 6A is a top view of a harness according to an embodiment of the current invention.
Figure 6B:
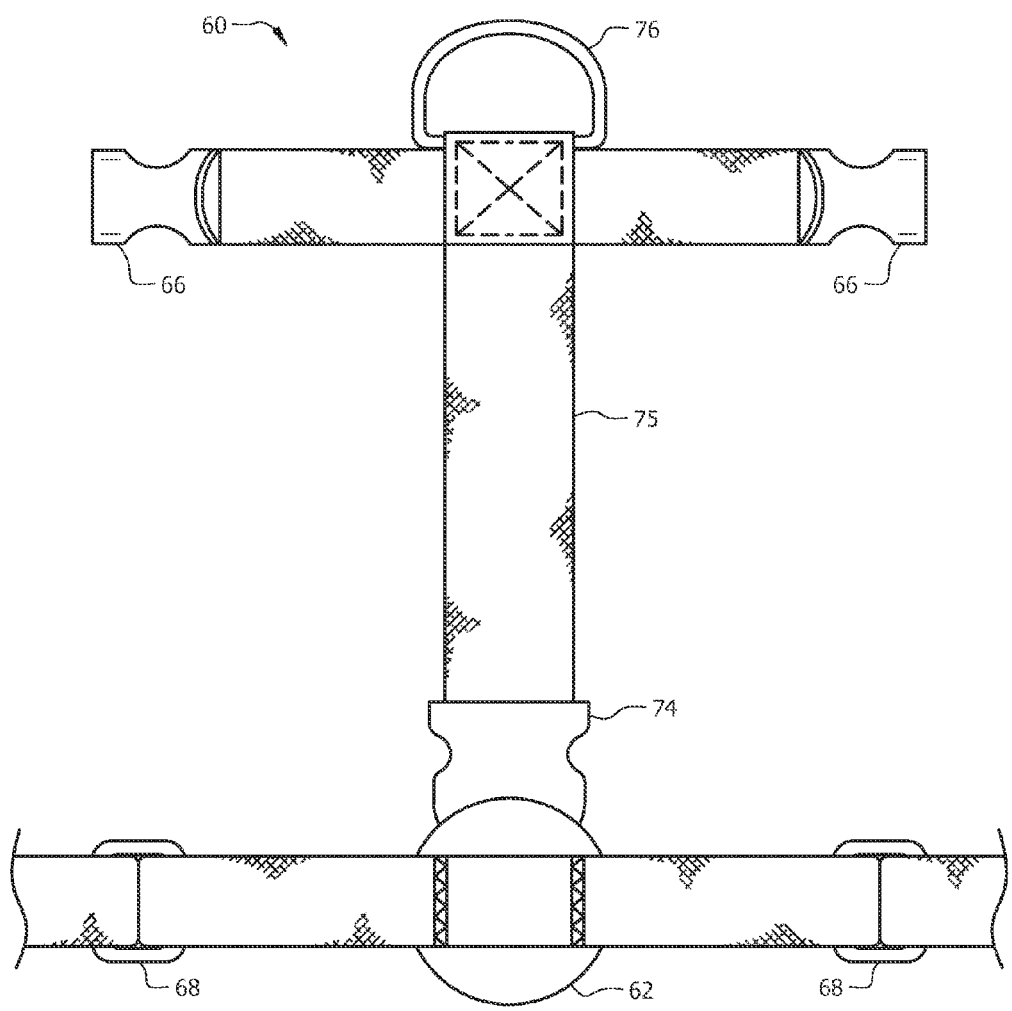
FIG. 6B is a bottom view of the harness of FIG. 6A.

A harness and leash assembly is generally denoted in FIGS. 6A-6B as reference numeral 60. Hub 62 contains housing assembly (not shown in this figure), spring (not shown in this figure), and leash line 72. From hub 62, anterior collar 71 extends laterally along the anterior portion of the pet's body. Adjusting buckles 68 are disposed along anterior collar 71 to adjust size and positioning of anterior collar 71 relative to the pet's body.

LR buckle snap 74 connects hub 62 to connecting collar 75, which extends in perpendicular relation to anterior collar 71 along the length of the pet's body. LR buckle snap 74 may be configured in any suitable manner, for example a LR socket attached to hub 62 and a LR latch attached to connecting collar 75, or vice versa. In this scenario, the LR socket would be similar to LR socket 16a seen in FIG. 1A, and the LR latch would be similar to LR latch 36a seen in FIG. 3A.

Leash line 72 extends from hub 62 through LR buckle snap 74 and through aperture 78 into pouch 64, which forms a majority of connecting collar 75. Leash line 72 terminates at its attachment with handle 70, which is disposed within pouch 64 when the leash is not in use. Flap 69 may be secured to connecting collar 75 via connector 73. Connector 73 may be any suitable connection type, such as a snap button, hook, loop, etc.

Connecting collar 75 terminates in posterior collar 77, which extends in perpendicular relation to connecting collar 75. Buckle snap 66 is attached to each end of posterior collar 77 and allows assembly 60 to be secured around the posterior portion of the pet's body.

D-ring 76 is optionally disposed along posterior collar 77 for additional attachment purposes.

Figure 7A:
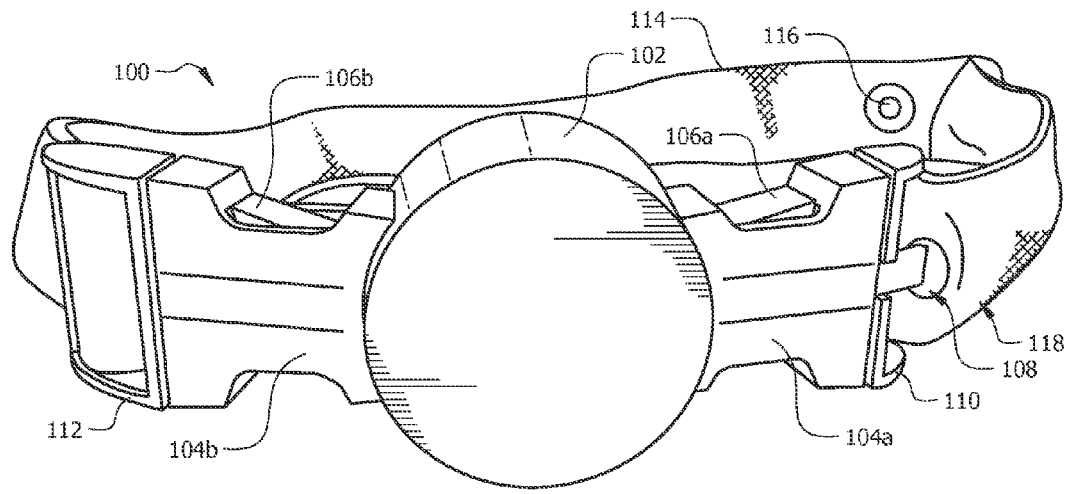
FIG. 7A is a perspective view of an embodiment of the current invention.
Figure 7B:
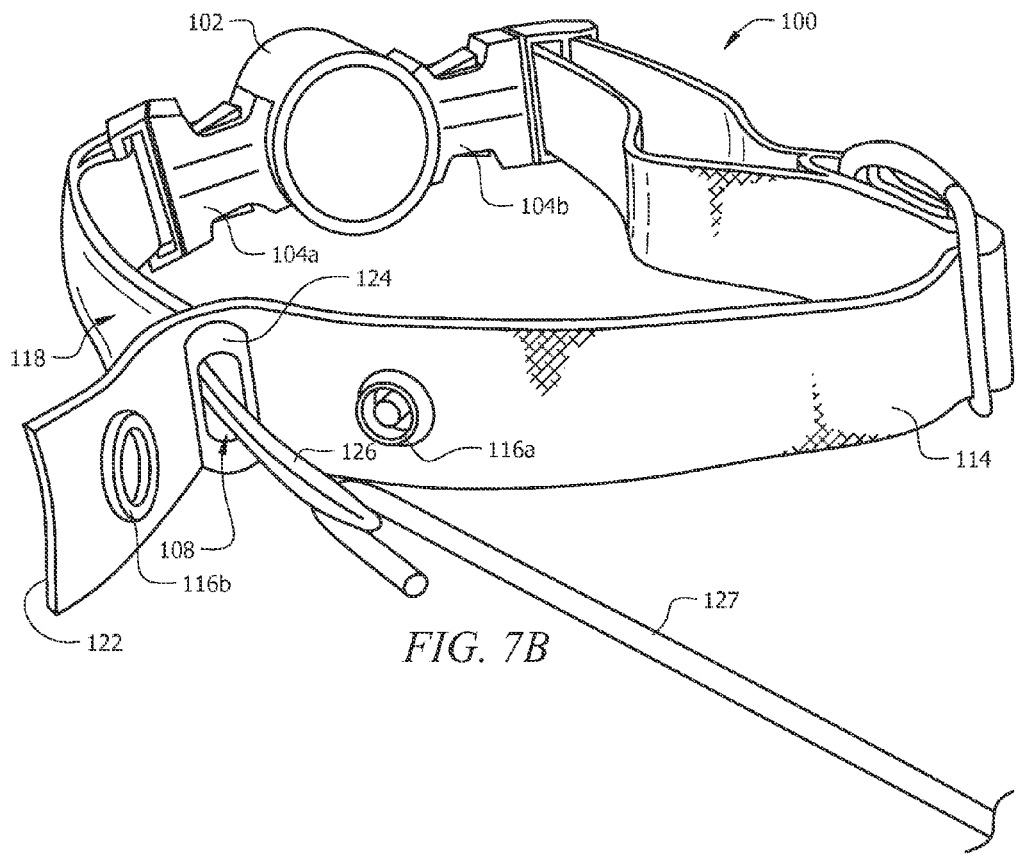
FIG. 7B depicts a tubing contained adjacent to a leash-receiving latch with leash extending therethrough, according to the embodiment of FIG. 7A.

Another aspect of harness and leash assembly 60 is that any harness and pouch—similar to pouch 64 and the harness shown including anterior collar 71, connecting collar 75, and posterior collar 77—is interchangeable with each other, so long as it may attach to hub 62. LR buckle snap 74 is detached, and if a user desires a new harness, the user can connect a new harness, as long as it has the appropriate components (e.g., pouch, LR buckle snap, etc.). To interchange the harness and provide a fully functioning new assembly, handle 70 must be inserted into the new aperture and through the new pouch of the new connecting collar. To facilitate this action, interchange hook (not shown) may be provided, though other suitable tools are contemplated. An example of an interchange hook is depicted in FIG. 7B and is fully described infra. The interchange hook would temporarily engage handle 70 and would be inserted through the new aperture of the new connecting collar into and through the new pouch with handle 70.

Example 2

A collar and leash assembly is generally denoted in FIGS. 7A-9B as reference numeral 100. Assembly 100 includes hub 102 enclosing housing assembly (not shown in this figure), spring (not shown in this figure), and leash line 128. Symmetrically extending from opposite sides of hub 102 are LR socket 104A and CR socket 104B. LR latch 106a is structured to correspond to LR socket 104A, and CR latch 106b is structured to correspond to CR socket 104B.

Figure 7C:
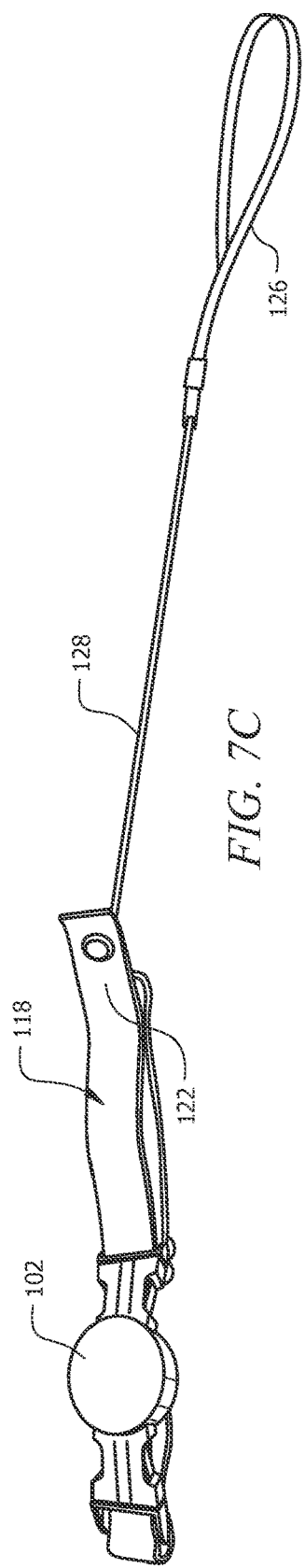
FIG. 7C depicts the leash of FIG. 7B extending through the tubing away from the collar.

LR latch 106a further includes collar restraint 110, to which one end of collar 114 is secured. CR latch 106b further includes adjustable collar restraint 112, to which the opposite end of collar 114 is secured. The end of collar 114 secured to collar restraint 110 includes handle pouch 118. Handle pouch 118 is in communication with hub 102 via leash line 128 extending from hub 102 through aperture 108 into handle pouch 118 as leash line 128 is coupled to handle 126. This allows handle 126 to remain substantially within pouch 118 (as part of collar 114), as is apparent in FIG. 6B, when connector 116, made up of male connector 116a and female connector 116b, is engaged to close of pouch flap 122, which effectively seals pouch 118. As depicted in FIG. 7c, when male connector 116a and female connector 116b are disengaged, flap 122 opens, and a force may be placed on handle 126 to pull handle 126 and leash line 128 through pouch 118.

Aperture 108 extends from adjacent to LR latch 106a through the hollow interior channel of pouch 118 and exits along leash 114 prior to connector 116. Hollow tubing 124 may optionally be disposed within pouch 118 to direct the flow of handle 126 and leash line 128 through pouch 118 more effectively, as hollow tubing 124 would reduce the friction experienced by handle 126 and leash line 128. In this case, aperture 108 would be disposed on each end of tubing 124, as is evident in FIG. 7B. Optionally, the end of tubing 124 distal to LR latch 106a may be characterized by higher rigidity than the remaining portion of tubing 124 in order to provide additional stability to leash 114 and leash line 128.

Another aspect of collar and leash assembly 100 is that any collar and pouch, similar to collar 114 and pouch 118, is interchangeable with each other, as long as it may attach to hub 102. LR socket 104A and LR latch 106a are detached, CR socket 104B and LR socket 106b are detached, and collar 114 is removed. Then, if a user desires a new collar, the user can connect a new collar, as long as it has the appropriate components (e.g., pouch, LR socket, LR latch, CR socket, CR latch, etc.). To interchange the collar and provide a fully functioning new assembly, handle 126 must be inserted into the new aperture and through the new pouch of the new collar. To facilitate this action, interchange hook 127 is provided, though other suitable tools are contemplated. As depicted in FIG. 7B, Interchange hook 127 temporarily engages handle 126 and is inserted through the new aperture and new pouch with handle 126. When interchange hook 127 and handle 126 exits the opposite side of the new pouch, as seen in FIG. 7B, interchange hook 127 is disengaged from handle 126, thus providing a fully functional new assembly, identical to the functionality provided prior to removal of collar 114 and attachment of the new collar. A user may wish to interchange collars in order to replace old collars, to provide new aesthetics for the assembly, to use one hub with multiple dogs that need different-sized collars, or any other reasoning. Interchange hook 127 facilitates this collar replacement.

Figure 8A:
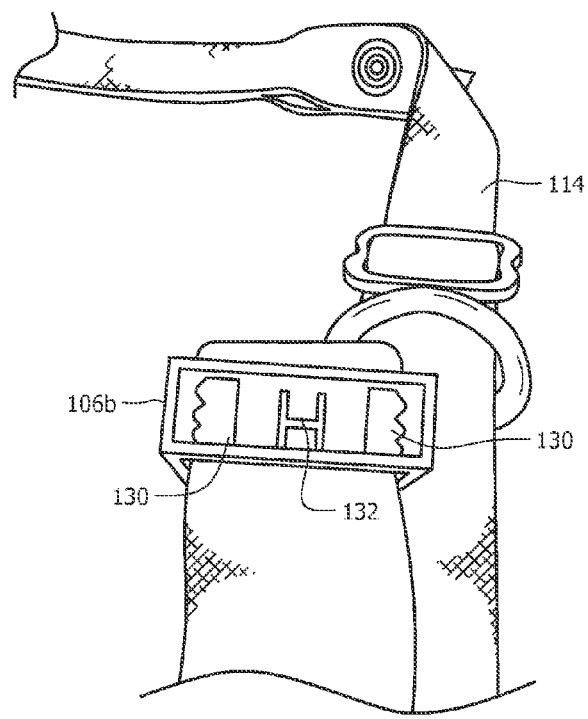
FIG. 8A depicts the collar-receiving latch of FIG. 7A.
Figure 8B:
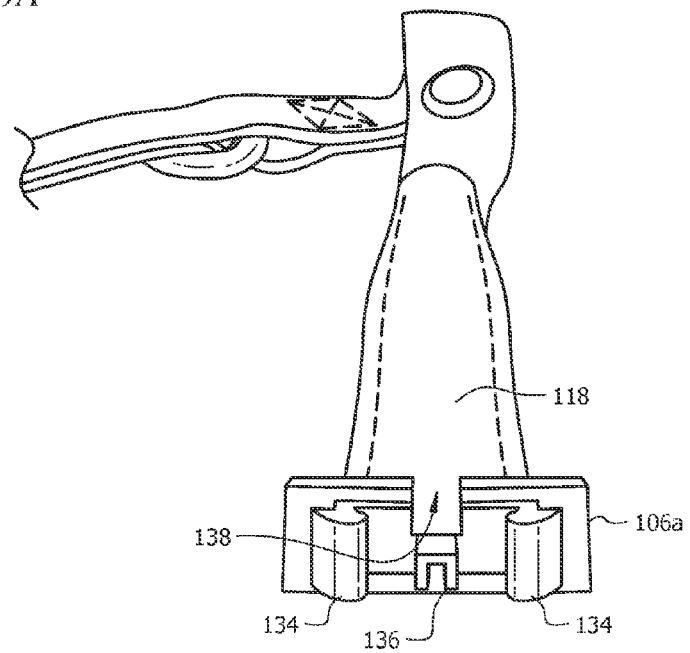
FIG. 8B depicts the leash-receiving latch of FIG. 7A.

Shown in FIG. 8A, CR latch 106b includes latch arms 130 disposed in parallel relation to and symmetrically on either side of H-shaped insert 132. Shown in FIG. 8B, LR latch 106a includes latch arms 134 disposed symmetrically on either side of n-shaped insert 136. n-shaped insert 136 has a planar top surface that leads to channel 138 notched within LR latch 106a. Leash line 128 may traverse along the top planar surface of n-shaped insert 136 and through channel 138, at which point leash line 128 may enter pouch 118 through aperture 108.

Figure 9A:
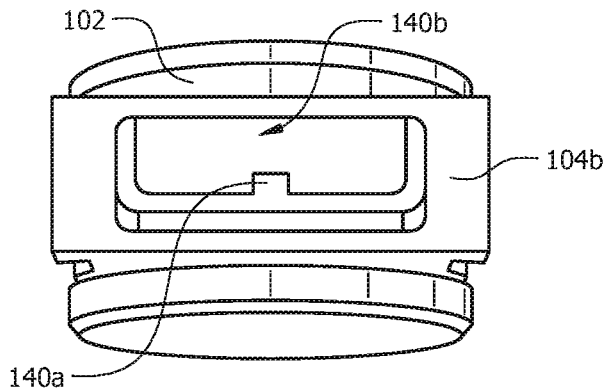
FIG. 9A depicts the collar-receiving socket of FIG. 7A, said collar-receiving socket receiving the collar-receiving latch of FIG. 8A.
Figure 9B:
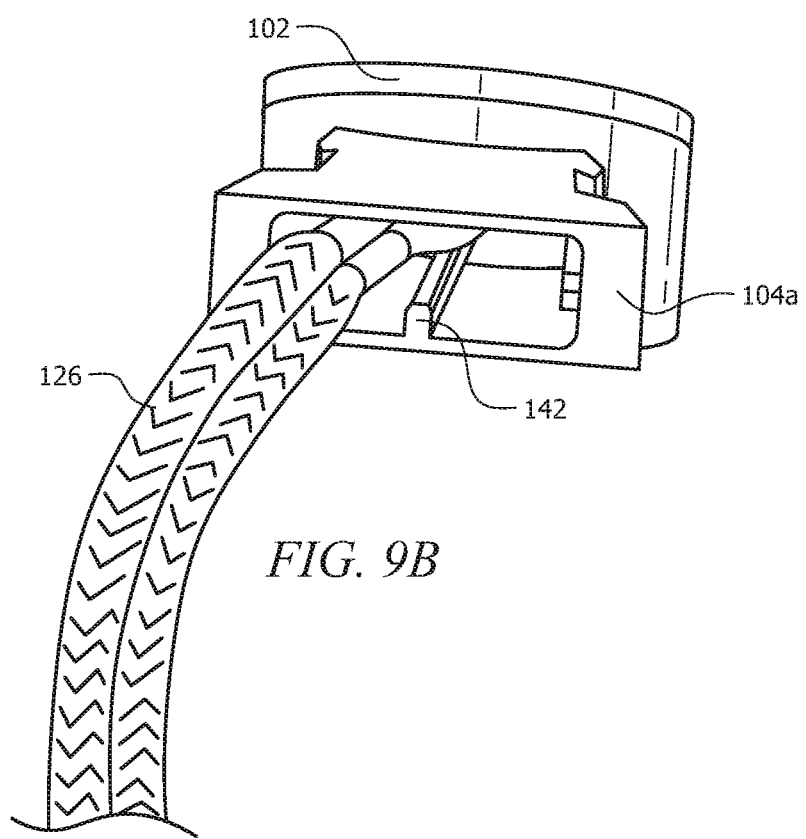
FIG. 9B depicts the leash-receiving socket of FIG. 7A, said leash-receiving socket receiving the leash-receiving latch of FIG. 8B.
Figure 10A:
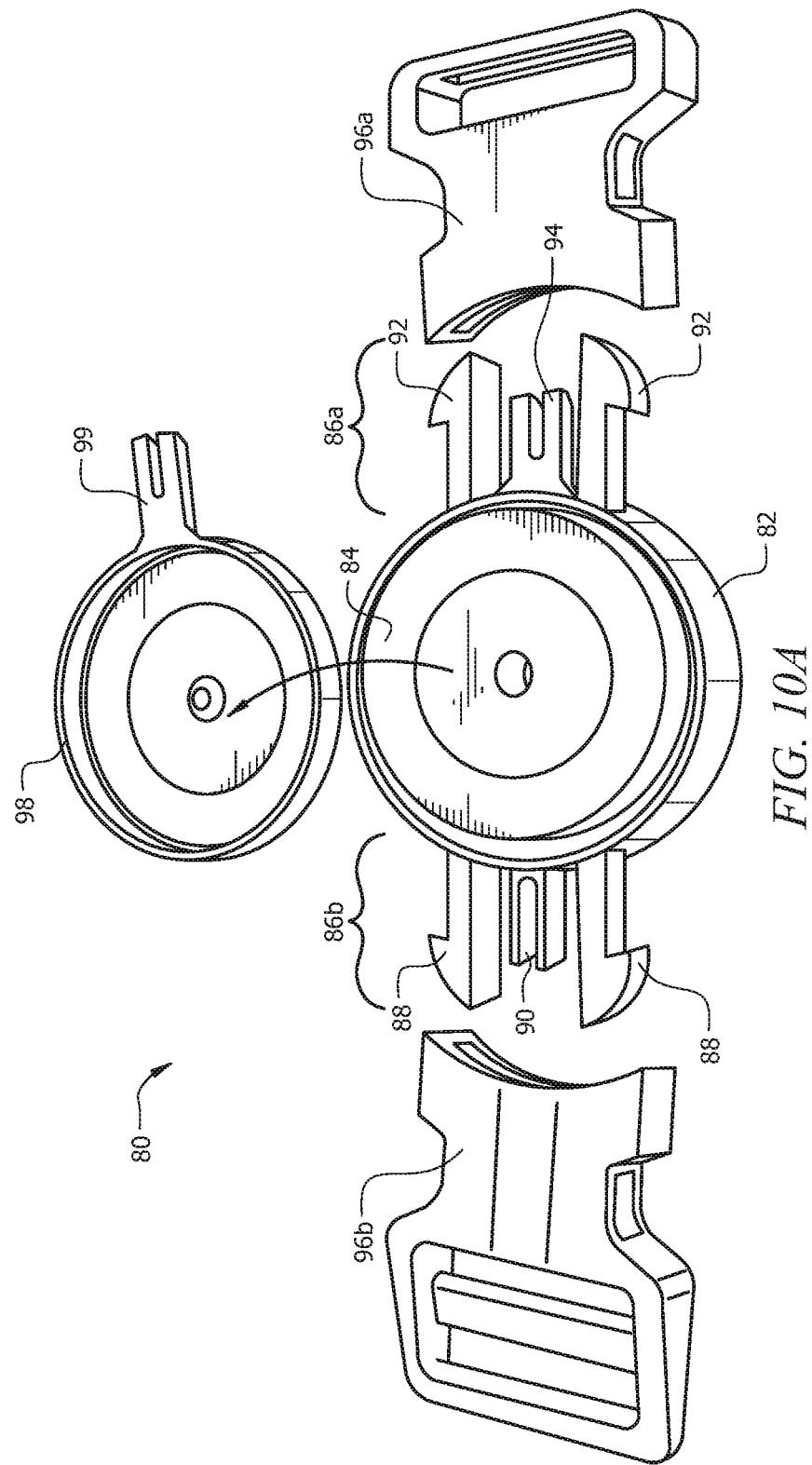
FIG. 10A is a perspective view of a capsule, latches extending therefrom, corresponding sockets, hub cover, and spool according to an embodiment of the current invention.
Figure 10B:
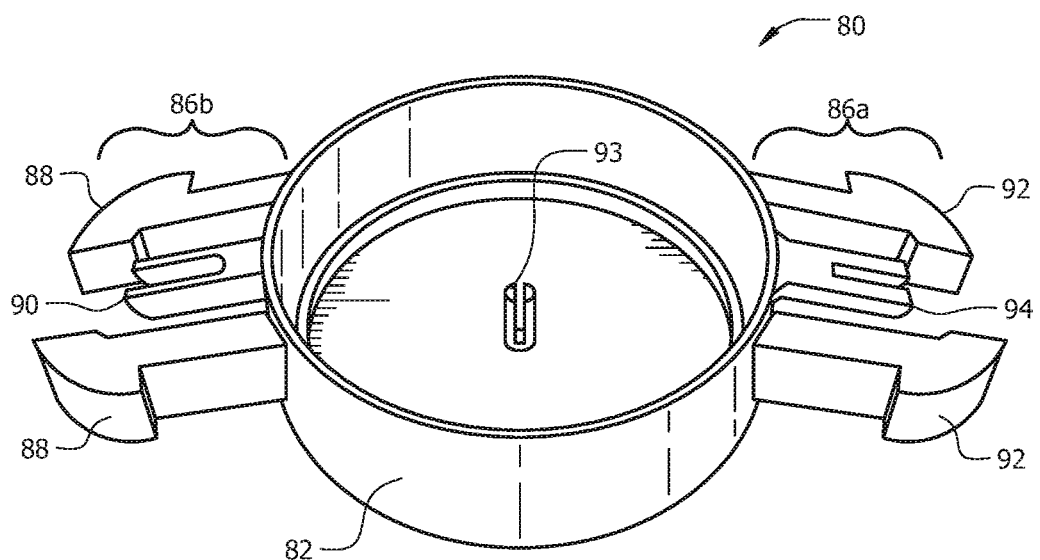
FIG. 10B is a perspective view of the capsule of FIG. 10A.

Shown in FIG. 9A, CR socket 104B extends from hub 102 and includes bottom notch 140a and top notch 140b along its bottom and top inner surfaces. Shown in FIG. 9B, LR socket extends from hub 102 and includes bottom notch 142 but no top notch. The absence of a top notch provides space for handle 126 and for leash line 128 to wind and unwind from within hub 102.

Example 3

A variant of the hub and socket assembly is generally denoted in FIGS. 10A-11C as reference numeral 80. Assembly 80 includes capsule 82 containing spring and line housing assembly 84 contained therein. Assembly 80 further includes hub cover 98 disposed in overlying relation to housing assembly 84 such that the outer edges of hub cover 98 contact the outer edges of capsule 82 to seal the contents (i.e., spring arbor 93, housing assembly 84, spring (not shown in this figure), and leash line (not shown in this figure)) contained therein.

LR latch 86a and CR latch 86b extend outwardly from capsule 82 in a substantially horizontal or slightly angled (to conform to the pet's body) manner. LR latch 86a is structured to correspond to LR socket 96a, and CR latch 86b is structured to correspond to CR socket 96b. One end of the leash (not shown in this figure) would be secured to LR socket 96a, and the other end would be secured to CR socket 96b. The end secured to LR socket 96a would include the handle pouch, similar to that seen in FIGS. 7A-7B.

Figure 11A:
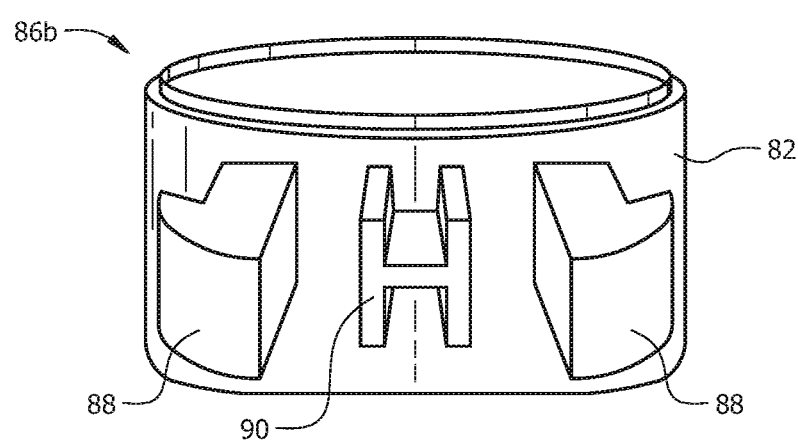
FIG. 11A depicts the collar-receiving latch of FIG. 10A.
Figure 11B:
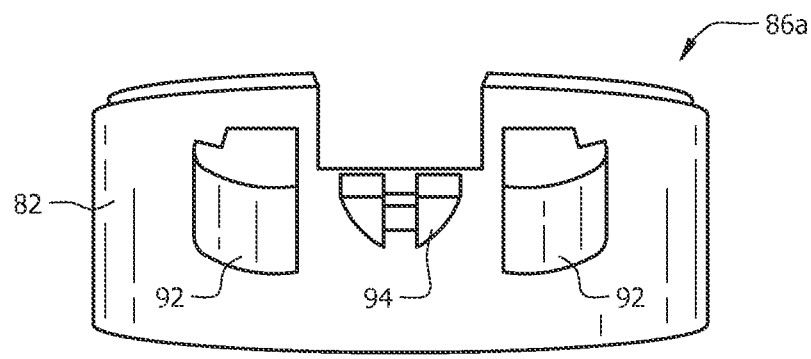
FIG. 11B depicts the leash-receiving latch of FIG. 10A.

The CR latch is generally denoted in FIG. 11A as reference numeral 86b. CR latch 86b extends from capsule 82 and includes latch arms 88 protruding parallel to and on either side of H-shaped insert 90. The LR latch is generally denoted in FIG. 11B as reference number 86a. LR latch 86a extends from capsule 82 and includes latch arms 92 protruding parallel to and on either side of bottom leash insert 94.

Figure 11C:
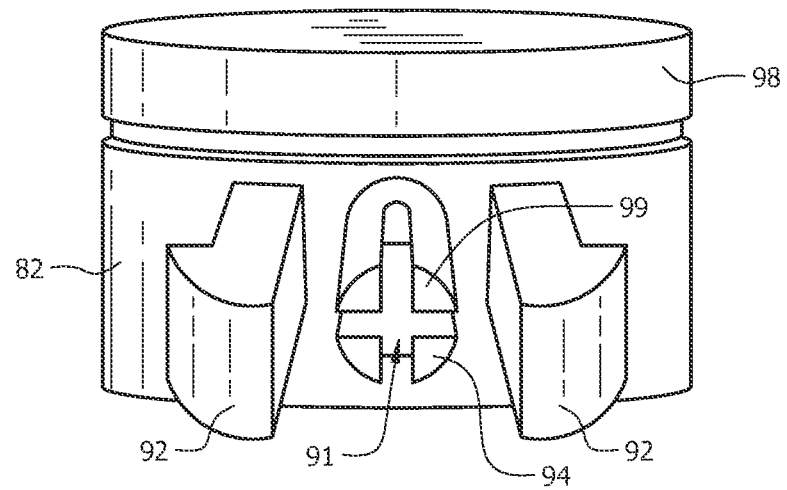
FIG. 11C depicts the leash-receiving latch with engaged hub cover of FIG. 10A.

FIG. 11C shows hub cover 98 positioned in overlying relation to capsule 82, such that top leash insert 99 is positioned in overlying relation and parallel to bottom leash insert 94, thereby forming leash line channel 91 therewithin. Leash line channel 91 allows the leash line (not shown in this figure) to flow from within capsule 82 through LR latch 86a, through LR socket 96a and into the pouch (not shown in the figure). Top leash insert 99 has a similar length and mirrored shape as bottom leash insert 94 to allow leash line channel 91 to be uniform and consistent.

INDEX OF REFERENCE NUMERALS

- 10: hub
- 12: leash line
- 14: handle
- 16a: LR socket
- 16b: CR socket
- 18: capsule
- 19: channel
- 20: spring and line housing (line reel/spring housing assembly)
- 21: power spring
- 22: hub cover
- 24: lubrication
- 26: polyurethane dome
- 28: sticker
- 30: collar
- 32: adjustable slide
- 34: D-ring
- 36a: LR latch
- 36b: CR latch
- 38a: collar-side button
- 38b: collar-side button
- 40: latch channel
- 42: n-shaped insert
- 44: latch arm
- 46: collar restraint
- 52: H-shaped insert
- 54: latch arm
- 56: adjustable collar restraint
- 58a: spring arbor
- 58b: spring arbor receptor
- 60: harness and leash assembly
- 62: hub
- 64: handle pouch
- 66: latch
- 68: adjustable slide
- 69: pouch flap
- 70: handle
- 71: anterior collar
- 72: leash line
- 73: general connector
- 74: hub connector
- 75: connecting collar
- 76: D-ring
- 77: posterior collar
- 78: leash aperture
- 80: embodiment of collar and leash assembly
- 82: capsule
- 84: spring and line housing assembly
- 86a: LR latch
- 86b: CR latch
- 88: latch arm
- 90: H-shaped insert
- 91: leash line channel
- 92: latch arm
- 93: hub cover
- 94: bottom leash insert
- 96a: LR socket
- 96b: CR socket
- 98: hub cover
- 99: top leash insert
- 100: embodiment of collar and leash assembly
- 102: hub
- 104A: LR socket
- 104B: CR socket
- 106a: LR latch
- 106b: CR latch
- 108: leash aperture
- 110: collar restraint
- 112: adjustable collar restraint
- 114: collar
- 116: general connector
- 116a: male connector
- 116b: female connector
- 118: handle pouch
- 122: pouch flap
- 124: tubing
- 126: handle
- 127: interchange hook
- 128: leash line
- 130: latch arm
- 132: H-shaped insert
- 134: latch arm
- 136: n-shaped insert
- 138: latch channel
- 140a: bottom notch
- 140b: top notch
- 142: bottom notch Definition of Claim Terms Anterior collar portion: This term is used herein to refer to a part of the collar supporting or encircling the neck or other anterior portion of the pet.

Anterior portion: This term is used herein to refer to the portion of the pet's body situated near or toward the head or toward the part of the pet's body most nearly corresponding to the head. Thus, an anterior leash portion would be closer to the pet's head than a posterior leash portion.

Capsule: This term is used herein to refer to a case or enclosure for covering or protecting the contents therein. Thus, a spring and line housing assembly, spring, and leash line can be enclosed and protected, at least in part, by a capsule.

Collar: This term is used herein to refer to a detachable band, strip, or chain worn around the neck of an animal. A collar, or a portion thereof, may also be called a "collar member".

Connecting collar: This term is used herein to refer to a part of the collar the links or couples the anterior collar portion and posterior collar portion. Thus, the connecting collar should run substantially along the longitudinal extent of the pet between the anterior collar portion and posterior collar portion.

Flange: This term is used herein to refer to the top leash insert that is utilized in an embodiment of the current invention to enclose a channel through which the leash line can flow.

Handle: This term is used herein to refer to any part of an overall apparatus that is designed especially to be grasped by a hand. For the current invention, any conventional handle may be used, for example a strap.

Harness: This term is used herein to refer to restraint or support for, said restraint or support including a loop or network of ropes, lines, or straps. Typically, a harness not only encircles the pet's neck, as a collar does, but also encircles the pet's torso or posterior portion.

Hollow pouch: This term is used herein to refer to any pocket or bag-shaped object that has unfilled space therein to store or maintain another object. For example, as used in the current invention, a hollow pouch is formed in a part of the leash where the handle may be stored or maintained when not in use, and when in use, the handle may be released, and the pouch would allow the leash line to flow through its unfilled space.

Hollow tubing: This term is used herein to refer to material in the form of a tube that has unfilled space therein to store or maintain another object.

Hub cover: This term is used herein to refer to a binding, top, or lid of a hub used to envelop or protect the contents therein. A hub cover may be structurally developed in a particular manner to provide further function, such as creating the top portion of a channel through which a leash line can flow, as taught in an embodiment of the current invention.

Hub: This term is used herein to refer to a central part of a larger apparatus where multiple items meet. Thus, as used in an embodiment of the current invention, the hub is where snap buckles, collars, etc. may meet.

Latch: This term is used herein to refer to the male connector of a snap buckle. Typically, a latch includes arms and inserts that can be inserted into the female connector to secure the connection of the snap buckle.

Lateral channel: This term is used herein to refer to an enclosed passage that has a longitudinal aspect disposed laterally along the pet's body.

Lateral extent: This term is used herein to refer to a range of an object running in the direction pertaining to the sides (left/right) of the object. For example, a pet can have a lateral extent running toward the sides of its body.

Leash line: This term is used herein to refer to the strap, cord, or rope that couples the handle of the leash to the hub on the collar.

Leash: This term is used herein to refer to a line (e.g., strap, cord, rope) that is used to restrain an animal.

Leash-receiving: This term is used herein to refer to an object having the capability to receive a portion of a leash therein or therethrough. Thus, a leash-receiving snap buckle is structured to allow a leash to flow through its interior (i.e., in one side of the snap buckle and out the opposite side of the snap buckle).

Longitudinal channel: This term is used herein to refer to a channel running along or parallel to the longitudinal extent (i.e., long axis) of an object or body.

Longitudinal extent: This term is used herein to refer to a range of an object running in the direction of the long axis of the object. For example, a pet can have a longitudinal extent along the length of its body, and a leash can have a longitudinal extent along the long axis of the leash.

Notched channel: This term is used herein to refer to a passageway formed in the circumference of the spring and line housing assembly to facilitate rotation of the leash line to wind and unwind the leash line into and out of the hub.

Pet: This term is used herein to refer to any animal for which various embodiments of the current invention may be needed.

Posterior collar portion: This term is used herein to refer to a part of the collar supporting or encircling the torso or other posterior portion of the pet.

Posterior portion: This term is used herein to refer to the portion of the pet's body situated near or toward the tail/rear or toward the part of the pet's body most nearly corresponding to the tail/rear. Thus, a posterior leash portion would be closer to the pet's tail/rear than an anterior leash portion.

Pulling force: This term is used herein to refer to the capacity of a user to cause a handle in the current invention to be transported away from the hub of the apparatus, regardless of direction.

Retractable: This term is used herein to refer to the ability of an object to be released and drawn back under its own force. Thus, a leash may be retractable if a pulling force would release the leash from its hub, and once the force ceases, the leash can withdraw into its hub automatically (i.e., without any external force).

Snap buckle: This term is used herein to refer to a type of connector containing a male portion and a compatible female portion. When the male portion (e.g., latch) is inserted into the female portion (e.g., socket), the male portion snaps into the empty portions of the female portion to secure the connection. Other conventional types of snap buckles, and connectors generally, are contemplated by the current invention.

Socket: This term is used herein to refer to female connector of a snap buckle. Typically, a socket is specifically structured with empty spaces to receive a particular male connector to secure the connection of the snap buckle.

Spring and line housing assembly: This term is used herein to refer to an apparatus enclosed within the hub of the current invention and facilitates the rotation of the spring and leash line to wind and unwind the leash line into and out of the hub.

Spring member: This term is used herein to refer to an elastic or flexible object or material that can be distorted when a force is applied to it but recovers its original shape when the force is released.

The advantages set forth above, and those made apparent from the foregoing disclosure, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A retractable leash and collar assembly for a pet, comprising:
a hub having a substantially hollow interior;
an aperture formed in said hub;
a coiled spring enclosed within said hollow interior, said coiled spring having a first end secured to said hub;
a coiled leash line enclosed within said hollow interior, said coiled spring having a second end secured to a first, inner end of said coiled leash line and a second, outer end of said coiled leash line extending through said aperture and being disposed externally of said hollow interior;
a handle coupled to said second, outer end of said leash line;
a snap buckle base formed integrally with and extending radially outwardly from said hub;
a first channel formed in said snap buckle base, said first channel being in open, aligned communication with said aperture formed in said hub;
a snap buckle connector having a leading end that releasably engages said snap buckle base;
a second channel formed in said snap buckle connector, said second channel formed in said snap buckle connector being aligned with said first channel formed in said snap buckle base to form a rigid channel therebetween when said snap buckle base and said snap buckle connector are engaged with each other,
said snap buckle connector leading end having a position of repose that prevents separation of said snap buckle connector and said snap buckle base, said snap buckle connector and said snap buckle base remaining connected to one another in order to form said rigid channel defined by said first and second channels when said leash and collar assembly is in use,
said snap buckle connector leading end having a position of non-repose that enables separation of said snap buckle connector from said snap buckle base when said leash and collar assembly is not in use; and
a collar having a first end and a second end, said first end of said collar secured to a trailing end of said snap buckle connector,
said rigid channel formed between said snap buckle base and said snap buckle connector slidingly receiving said leash line and constraining said leash line to remain within said rigid channel as said leash line is displaced in a first direction through said rigid channel when said leash line is withdrawn from said hollow interior of said hub through said aperture against an inherent bias of said coiled spring and when said leash line is displaced in a second direction opposite to said first direction when said leash line is drawn into said hollow interior of said hub through said aperture by the inherent bias of said coiled spring,
said rigid channel having a predefined set of spatial boundaries or confines that remains unbroken or constant during the entirety of said leash line being withdrawn from and retracted into said hub, said rigid channel being solidly formed between said snap buckle base and said snap buckle connector in order to enable movement of said leash line in any direction against said spatial boundaries of said rigid channel without breaking or altering said predefined set of spatial boundaries of said rigid channel.

2. A retractable leash and collar assembly as in claim 1, further comprising:
an additional snap buckle base extending radially outwardly from said hub in diametric opposition to said snap buckle base; and
an additional snap buckle connector having a leading end that releasably engages said additional snap buckle base,
wherein said second end of said collar is secured to a trailing end of said additional snap buckle connector.

3. A retractable leash and collar assembly as in claim 1, further comprising:
a hollow pouch formed in said collar adjacent said first end of said collar member, said hollow pouch disposed in housing relation to said handle when said leash line is coiled and enclosed within said hollow interior, said leash line extending through said hollow pouch when a pulling force is imposed on said handle.

4. A retractable leash and collar assembly as in claim 3, further comprising:
a hollow tubing entirely housed within and along a longitudinal extent of said hollow pouch, such that said handle can enter freely into and out of said hollow tubing, said hollow tubing being stationary relative to said leash line as said leash line is displaced in said first direction and in said second direction.

5. A retractable leash and collar assembly as in claim 1, further comprising:
a spring and line housing assembly positioned within said hollow interior of said hub; and
a housing assembly formed within said hollow interior of said hub,
said spring coiled around said housing assembly,
said leash line coiled around said housing assembly,
said spring being in communication with said housing assembly.

6. A retractable leash and collar assembly as in claim 5, further comprising:
said housing assembly having a notched channel along an outer circumference of said housing assembly; and
said leash line coiled around said housing assembly within said notched channel.

7. A retractable leash and collar assembly as in claim 1, further comprising:
said hub including a capsule and a hub cover disposed in overlying relation to said capsule;
said snap buckle base being a latch attached to said capsule and extending radially outwardly from said capsule;
said snap buckle connector being a socket for securing to said latch; and
a flange protruding outwardly from said hub cover and positioned in overlying relation to said latch to form said rigid channel therebetween.

8. A retractable leash and collar assembly as in claim 1, further comprising:
said snap buckle base being a socket that is attached to a sidewall of said hub and extending radially outwardly from said hub;
said snap buckle connector being a latch for securing to said socket; and said first end of said collar secured to said latch that corresponds to said socket.

* * * * *